(12) United States Patent
Byun et al.

(10) Patent No.: US 9,257,694 B2
(45) Date of Patent: Feb. 9, 2016

(54) RECHARGEABLE BATTERY HAVING A LEAD TAB WITH INJECTION MATERIAL

(71) Applicant: SAMSUNG SDI CO., LTD., Yongin-si, Gyeonggi-do (KR)

(72) Inventors: Sang-Won Byun, Yongin-si (KR); Soo-Seok Choi, Yongin-si (KR); Hyung-Sik Kim, Yongin-si (KR); Min-Seok Koo, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 162 days.

(21) Appl. No.: 14/029,836

(22) Filed: Sep. 18, 2013

(65) Prior Publication Data

US 2014/0315053 A1    Oct. 23, 2014

(30) Foreign Application Priority Data

Apr. 17, 2013    (KR) .......................... 10-2013-0042370

(51) Int. Cl.

| | | |
|---|---|---|
| *H01M 2/34* | (2006.01) | |
| *H01M 2/30* | (2006.01) | |
| *H01M 2/20* | (2006.01) | |
| *H01M 2/02* | (2006.01) | |
| *H01M 2/06* | (2006.01) | |
| *H01M 2/26* | (2006.01) | |

(52) U.S. Cl.
CPC ............... *H01M 2/34* (2013.01); *H01M 2/263* (2013.01); *H01M 2/024* (2013.01); *H01M 2/06* (2013.01); *H01M 2/20* (2013.01); *H01M 2/30* (2013.01); *H01M 2200/103* (2013.01)

(58) Field of Classification Search
CPC . H01M 2/34; H01M 2/263; H01M 2200/103; H01M 2/024; H01M 2/06; H01M 2/30; H01M 2/20

See application file for complete search history.

(56) References Cited

U.S. PATENT DOCUMENTS

| | | | | |
|---|---|---|---|---|
| 6,899,972 | B2 | 5/2005 | Cho | |
| 2002/0086578 | A1* | 7/2002 | Ikeda | ............................ 439/500 |
| 2011/0244280 | A1* | 10/2011 | Byun et al. | ....................... 429/61 |
| 2011/0244281 | A1 | 10/2011 | Byun | |

(Continued)

FOREIGN PATENT DOCUMENTS

| | | |
|---|---|---|
| EP | 2 372 808 A1 | 7/2010 |
| EP | 2 544 264 A1 | 7/2012 |

(Continued)

OTHER PUBLICATIONS

Extended European Search Report dated Jan. 2, 2014.

*Primary Examiner* — Kenneth Douyette
(74) *Attorney, Agent, or Firm* — Lee & Morse, P.C.

(57) ABSTRACT

A rechargeable battery including an electrode assembly that performs a charge and discharge operation; a case that houses the electrode assembly; a cap plate coupled to an opening of the case; an electrode terminal installed in the cap plate; and a lead tab that connects the electrode assembly to the electrode terminal, wherein the lead tab includes a current collecting connection portion that is connected to the electrode assembly; a terminal connection portion that is bent from the current collecting connection portion to be connected to the electrode terminal; and an injection material that embeds the terminal connection portion in which a fuse is formed, and wherein the injection material includes an exposing hole therein, the exposing hole exposing at least one side of the fuse.

18 Claims, 8 Drawing Sheets

(56) References Cited

U.S. PATENT DOCUMENTS

2011/0248719 A1* 10/2011 Aoki .............................. 324/426
2013/0011703 A1* 1/2013 Kim et al. ....................... 429/61

FOREIGN PATENT DOCUMENTS

| JP | 2006-012602 A | 1/2006 |
| KR | 10-2003-0032562 A | 4/2003 |

* cited by examiner

RECHARGEABLE BATTERY HAVING A LEAD TAB WITH INJECTION MATERIAL

CROSS-REFERENCE TO RELATED APPLICATION

Korean Patent Application No. 10-2013-0042370, filed on Apr. 17, 2013, in the Korean Intellectual Property Office, and entitled: "Rechargeable Battery," is incorporated by reference herein in its entirety.

BACKGROUND

1. Field

Embodiments relate to a rechargeable battery

2. Description of the Related Art

A rechargeable battery may be repeatedly charged and discharged, unlike a primary battery. A rechargeable battery of a small capacity may be used for a small portable electronic device like a mobile phone or a laptop computer and a camcorder. A rechargeable battery of a large capacity may be used as a power source for driving a motor of a hybrid vehicle and an electric vehicle.

For example, the rechargeable battery may include an electrode assembly that performs charge and discharge operations, a case that houses the electrode assembly and an electrolyte solution, a cap plate that is coupled to an opening of the case, and a lead tab that electrically connects the electrode assembly to an electrode terminal.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly that performs a charge and discharge operation; a case that houses the electrode assembly; a cap plate coupled to an opening of the case; an electrode terminal installed in the cap plate; and a lead tab that connects the electrode assembly to the electrode terminal, wherein the lead tab includes a current collecting connection portion that is connected to the electrode assembly; a terminal connection portion that is bent from the current collecting connection portion to be connected to the electrode terminal; and an injection material that embeds the terminal connection portion in which a fuse is formed, and wherein the injection material includes an exposing hole therein, the exposing hole exposing at least one side of the fuse.

The exposing hole may be open toward the cap plate.

The fuse may be set in at least one side of a through-hole in the terminal connection portion, and the exposing hole may expose the fuse in the at least one side of the through-hole.

The exposing hole may be open toward the electrode assembly.

The fuse may be set in at least one side of a through-hole in the terminal connection portion, and the exposing hole may expose the fuse in the at least one side of the through-hole.

The exposing hole may include an upper hole that is open toward the cap plate; and a lower hole that is open toward the electrode assembly.

The injection material may include poly ethyl ether ketone.

The injection material may further include carbon.

The poly ethyl ether ketone may include one of polyphenylene sulfide or polycarbonate.

The injection material may have a mounting hole at a cap plate side thereof and at an electrode assembly side thereof in order to couple to the electrode terminal.

The injection material may be formed of an insulating and heat-stable material.

The fuse may be meltable in response to a predetermined voltage, and the injection material may maintain a disconnected state of the fuse upon melting of the fuse.

The fuse may be meltable in response to a predetermined voltage, and the injection material may electrically isolate ends of the fuse upon melting of the fuse.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
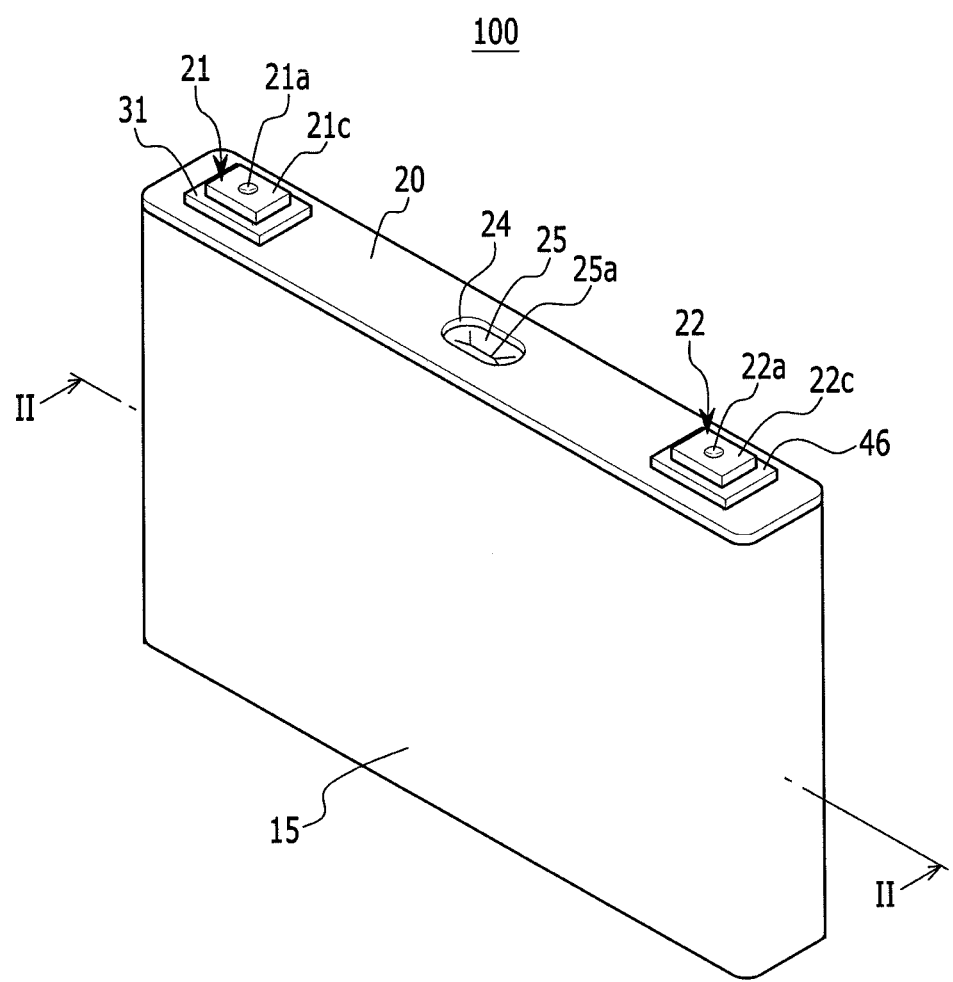
FIG. 1 illustrates a perspective view of a rechargeable battery according to an embodiment.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present.

The present invention will be described more fully hereinafter with reference to the accompanying drawings, in which exemplary embodiments are shown. As those skilled in the art would realize, the described embodiments may be modified in various different ways, all without departing from the spirit or scope of the embodiments. The drawings and description are to be regarded as illustrative in nature and not restrictive. Like reference numerals designate like elements throughout the specification.

Figure 2:
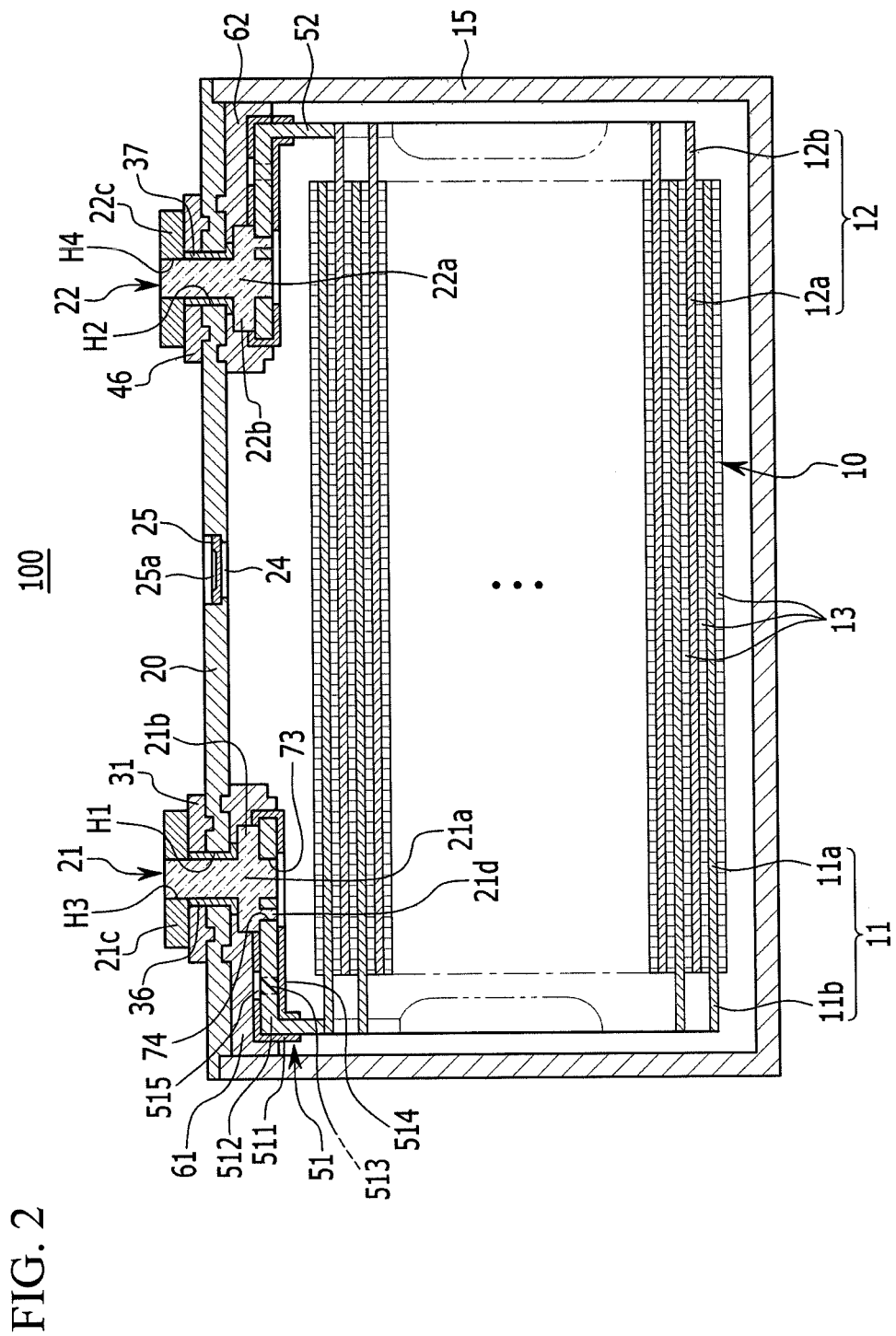
FIG. 2 illustrates a cross-sectional view of the rechargeable battery taken along line II-II of FIG. 1.

FIG. 1 illustrates a perspective view of a rechargeable battery 100 according to an embodiment. FIG. 2 illustrates a cross-sectional view of the rechargeable battery 100 taken along line II-II of FIG. 1. Referring to FIGS. 1 and 2, the rechargeable battery 100 according to the present embodiment may include an electrode assembly 10 that charges and discharges a current, a case 15 that houses the electrode assembly 10 and an electrolyte solution, a cap plate 20 that is coupled to an opening of the case 15, electrode terminals 21 and 22 that are installed in the cap plate 20, and lead tabs 51 and 52 that connect the electrode terminals 21 and 22 to the electrode assembly 10.

For example, the electrode assembly 10 may be formed by disposing an electrode (e.g., a negative electrode 11 and a positive electrode 12) at both surfaces of a separator 13, which is an insulator, and by spiral-winding the negative electrode 11, the separator 13, and the positive electrode 12 in a jelly roll state.

The negative electrode 11 and the positive electrode 12 may include coating regions 11a and 12a in which an active material is applied to a current collector of a metal plate and uncoated regions 11b and 12b, respectively, that are formed with an exposed current collector, as an active material is not applied.

The uncoated region 11b of the negative electrode 11 may be formed in an end portion of one side of the negative electrode 11 along the spiral-wound negative electrode 11. The uncoated region 12b of the positive electrode 12 may be formed in an end portion of one side of the positive electrode 12 along the spiral-wound positive electrode 12. The uncoated regions 11b and 12b may each be disposed at both ends of the electrode assembly 10.

The case 15 may be formed in an approximately cuboid to set space that houses the electrode assembly 10 at the inside. An opening of the case 15 may be formed at one side of the cuboid shape to enable insertion of the electrode assembly 10 from the outside to internal space.

The cap plate 20 may be installed in the opening of the case 15 to close and seal the case 15. For example, the case 15 and the cap plate 20 may be made of aluminum to be welded to each other. After the electrode assembly 10 is inserted into the case 15, the cap plate 20 may be welded to the opening of the case 15.

Further, the cap plate 20 may include at least one opening, e.g., terminal holes H1 and H2 and a vent hole 24. The electrode terminals 21 and 22 may be installed at the terminal holes H1 and H2, respectively, of the cap plate 20 to be electrically connected to the electrode assembly 10.

For example, the electrode terminals 21 and 22 may be electrically connected to the negative electrode 11 and the positive electrode 12 of the electrode assembly 10, respectively. Therefore, the electrode assembly 10 may be drawn out to the outside of the case 15 through the electrode terminals 21 and 22.

The electrode terminals 21 and 22 may include plate terminals 21c and 22c (that are disposed at the outside of the cap plate 20 to correspond to the terminal holes H1 and H2) and rivet terminals 21a and 22a (that are electrically connected to the electrode assembly 10 and that are fastened to the plate terminals 21c and 22c while penetrating the terminal holes H1 and H2, respectively).

The plate terminals 21c and 22c may have through-holes H3 and H4, respectively. The rivet terminals 21a and 22a may penetrate the terminal holes H1 and H2 at an upper end portion and are inserted into the through-holes H3 and H4, respectively. The electrode terminals 21 and 22 may further include flanges 21b and 22b that are integrally and widely formed in the rivet terminals 21a and 22a, respectively, at the inside of the cap plate 20.

At an electrode terminal 21 side (that is connected to the negative electrode 11), an external insulation member 31 may be interposed between the plate terminal 21c and the cap plate 20 and may electrically insulate the plate terminal 21c and the cap plate 20. For example, the cap plate 20 may maintain a state that is insulated from the electrode assembly 10 and the negative electrode 11.

By coupling the insulation member 31 and the plate terminal 21c to an upper end portion of the rivet terminal 21a and by riveting or welding the upper end portion, the insulation member 31 and the plate terminal 21c may be fastened to the upper end portion of the rivet terminal 21a. The plate terminal 21c may be installed at an outside of the cap plate 20 in a state in which the insulation member 31 is interposed.

At an electrode terminal 22 side that is connected to the positive electrode 12, a conductive top plate 46 may be interposed between the plate terminal 22c and the cap plate 20 and may electrically connect the plate terminal 22c and the cap plate 20. For example, the cap plate 20 may maintain a state that is electrically connected to the electrode assembly 10 and the positive electrode 12.

By coupling the top plate 46 and the plate terminal 22c to an upper end portion of the rivet terminal 22a and by riveting or welding the upper end portion, the top plate 46 and the plate terminal 22c may be fastened to the upper end portion of the rivet terminal 22a. The plate terminal 22c may be installed at an outside of the cap plate 20 in a state in which the top plate 46 is interposed.

Gaskets 36 and 37 may be installed between the rivet terminals 21a and 22a of the electrode terminals 21 and 22 and an inner surface of the terminal holes H1 and H2, respectively, of the cap plate 20 to seal between the rivet terminals 21a and 22a and the cap plate 20 and to electrically insulate the rivet terminals 21a and 22a and the cap plate 20.

The gaskets 36 and 37 may be further extended and may be installed between the flanges 21b and 22b and an inner surface of the cap plate 20 to further seal between the flanges 21b and 22b and the cap plate 20 and to electrically insulate the flanges 21b and 22b and the cap plate 20. For example, by installing the electrode terminals 21 and 22 in the cap plate 20, the gaskets 36 and 37 may help prevent an electrolyte solution from being leaked through the terminal holes H1 and H2.

The lead tabs 51 and 52 may electrically connect the electrode terminals 21 and 22 to the negative and positive electrodes 11 and 12, respectively, of the electrode assembly 10. For example, by coupling the lead tabs 51 and 52 to a lower end portion of the rivet terminals 21a and 22a and by caulking or welding the lower end portion, the lead tabs 51 and 52 may be connected to the lower end portion of the rivet terminals 21a and 22a while being supported by the flanges 21b and 22b.

Insulation members 61 and 62 may be installed between the lead tabs 51 and 52 and the cap plate 20, respectively, to electrically insulate the lead tabs 51 and 52 and the cap plate 20. Further, the insulation members 61 and 62 may be coupled with the cap plate 20 at one side thereof, and may enclose the lead tabs 51 and 52, the rivet terminals 21a and 22a, and the flanges 21b and 22b at another one side thereof to stabilize a connection structure.

In order to discharge an internal pressure and a generated gas of the rechargeable battery 100, the vent hole 24 may be closed and sealed by a bent plate 25. When an internal pressure of the rechargeable battery 100 approaches or exceeds a predetermined pressure, the bent plate 25 may be cutout or may burst to open the vent hole 24. The vent plate 25 may have a notch 25a that induces cutout or bursting.

Figure 3:
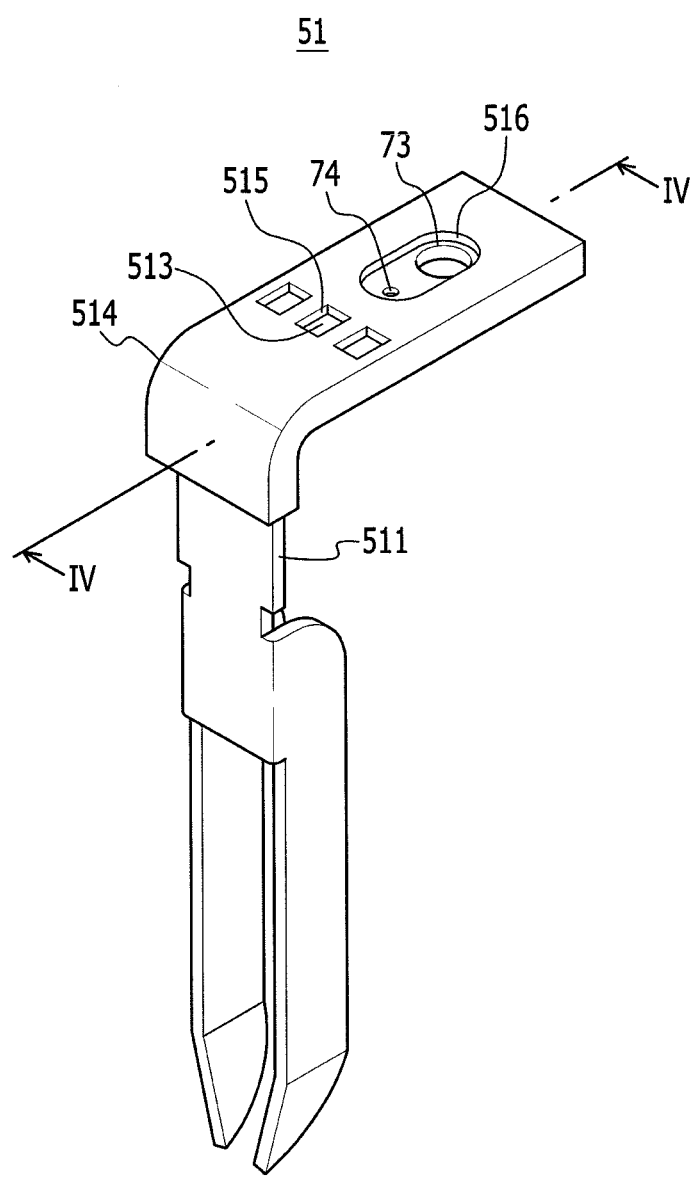
FIG. 3 illustrates a perspective view of a lead tab of FIG. 2.
Figure 4:
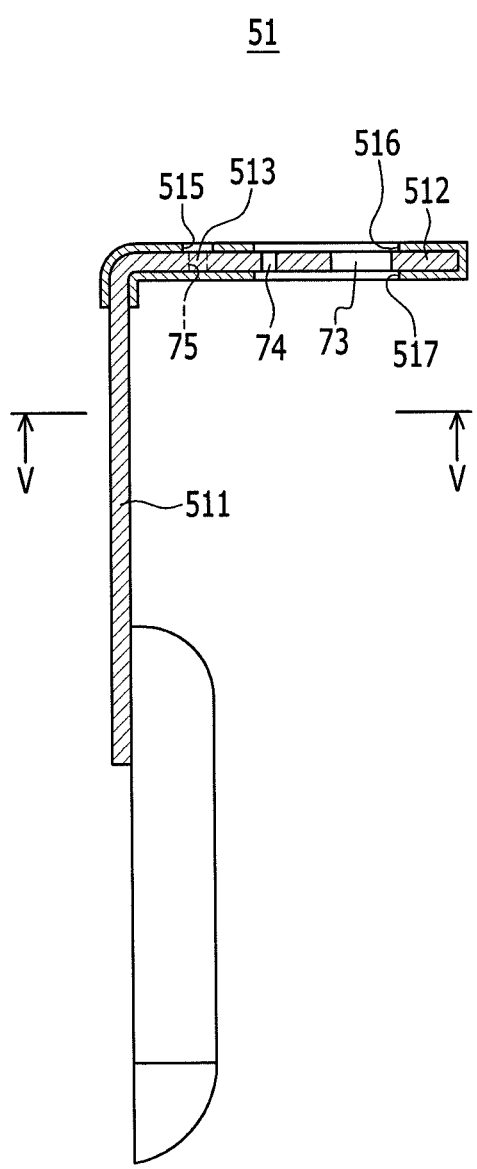
FIG. 4 illustrates a cross-sectional view of the lead tab taken along line IV-IV of FIG. 3.
Figure 5:
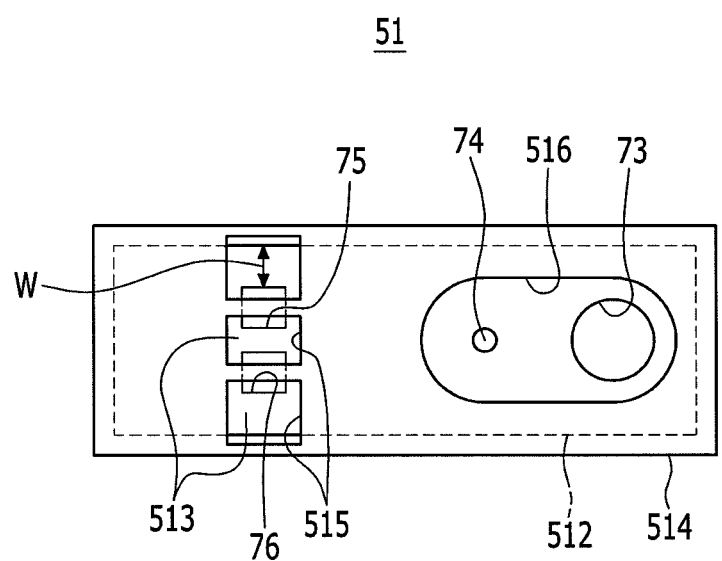
FIG. 5 illustrates a top plan view of the lead tab of FIG. 4.

FIG. 3 illustrates a perspective view of a lead tab of FIG. 2, FIG. 4 illustrates a cross-sectional view of the lead tab taken along line IV-IV of FIG. 3, and FIG. 5 illustrates a top plan view of the lead tab of FIG. 4. Because the lead tabs 51 and 52 are formed in the same structure, for convenience of description, the lead tab 51 that is connected to the negative electrode 11 of the electrode assembly 10 will be exemplified hereinafter.

Referring to FIGS. 2 to 5, the lead tab 51 may include a current collecting connection portion 511 (that is connected to the uncoated portion 11b of the negative electrode 11 of the electrode assembly 10), a terminal connection portion 512 (that is bent from the current collecting connection portion 511 to be connected to the rivet terminal 21a of the electrode terminal 21), and an injection material 514 (that embeds the terminal connection portion 512 in which the fuse 513 is formed). For example, the terminal connection portion 512 (in which the fuse 513 is formed) may be embedded in the injection material 514.

The terminal connection portion 512 may have through-holes 73 and 74 therein. By coupling a lower end portion and a protrusion 21d of the rivet terminal 21a to the through-holes 73 and 74, respectively, and by caulking or welding the lower end portion, while being supported by the flanges 21b and 22b, the terminal connection portion 512 may be connected to the lower end portion and the protrusion 21d of the rivet terminal 21a.

The terminal connection portion 512 may further include at least one additional through-hole, in addition to the through-holes 73 and 74 that are coupled to the rivet terminal 21a, and may have the fuse 513 that narrows a current passage. The fuse 513 may highly set or increase current resistance in the terminal connection portion 512, in order to be melted at a predetermined or excessively high voltage. For example, the fuse 513 may be set between a plurality of through-holes 75 and 76 in the terminal connection portion 512 and at sides of the through-holes 75 and 76 in the terminal connection portion 512.

By performing insert injection molding of the terminal connection portion 512 (having the fuse 513), the injection material 514 may embed or surround the fuse 513 and a periphery of the fuse 513. The injection material 514 may include an exposing hole 515 in at least one side of the fuse 513 and may expose at least one side of the fuse 513.

In addition, the exposing hole 515 may further expose a portion of the through-holes 75 and 76 that form the fuse 513 while exposing one side of the fuse 513. Therefore, the exposing hole 515 may expose an entire width W of each fuse 513 at one side of the fuse 513 and thus may not disturb melting of the fuse 513 at a predetermined high voltage. For example, the fuse 513 may be smoothly melted without disturbing the injection material 514. In an implementation, the exposing hole 515 may overlie an entire width of each fuse 513.

For example, the exposing hole 515 may be formed toward or may be open toward the cap plate 20. In an implementation, the injection material 514 may expose a cap plate 20 side of the fuse 513 by or through the exposing hole 515. Therefore, the injection material 514 may smoothly discharge a gas (that may be generated while the injection material 514 is melted by heat from the fuse 513 being melted) toward the cap plate 20 through the exposing hole 515.

In an implementation, portions of the injection material 514 at both sides of the exposing hole 515 may hold the melted fuse 513. Thus, the injection material 514 may help prevent the melted fuse 513 from being undesirably further deformed toward the cap plate 20 and/or may help prevent the fuse 513 from being undesirably re-connected. When the injection material 514 has a high electrical resistance, the melted fuse 513 may be prevented from being electrically connected by or to the injection material 514. Thus, when the fuse 513 operates, occurrence of an arc may be reduced and/or prevented.

For example, the injection material 514 may include poly ethyl ether ketone or may include poly ethyl ether ketone and carbon. In an implementation, the poly ethyl ether ketone may be formed with polyphenylene sulfide and/or polycarbonate.

When the injection material 514 includes poly ethyl ether ketone and carbon, the injection material 514 may have high electrical resistance. Thus, even in a situation in which the fuse 513 is melted, the injection material 514 connected at ends of the fuse 513 may have a high resistance, thereby preventing an electrical connection from being established between disconnected portions of the fuse 513 and/or the terminal connection portion 512. For example, the injection material 514 may have high resistance again current passage. Therefore, an arc may not occur at ends of the melted fuse 513.

In an implementation, when the injection material 514 does not include carbon and includes the poly ethyl ether ketone, the injection material 514 may not have conductivity and may hold ends of the melted fuse 513. Thus, deformation of the melted fuse 513 may be reduced and/or prevented. Therefore, occurrence of an arc may be reduced and/or prevented at ends of the melted fuse 513.

In order to couple to the electrode terminal 21, the injection material 514 may include mounting holes 516 and 517 at the cap plate 20 side and the electrode assembly 10 side. The mounting hole 516 of the cap plate 20 side may correspond to an outer edge of the flange 21b to house the flange 21b. The mounting hole 517 of the electrode assembly 10 side may correspond to the lower end portion of the rivet terminal 21a and an outer edge of the protrusion 21d, to house the lower end portion of the rivet terminal 21a and the protrusion 21d.

Hereinafter, various exemplary embodiments will be described. In the following description, constituent elements identical to or corresponding to those of the previous embodiment may be omitted, and only dissimilar constituent elements may be described.

Figure 6:
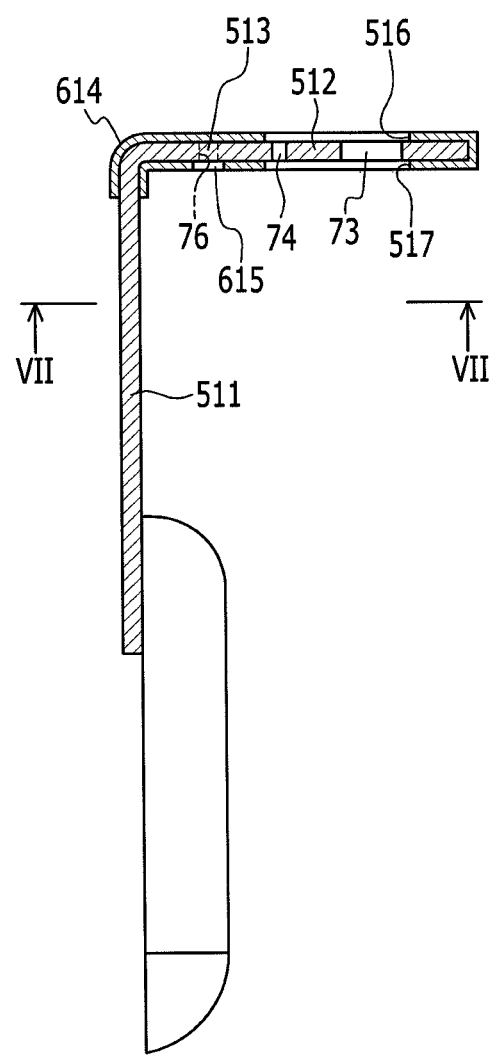
FIG. 6 illustrates a cross-sectional view of a lead tab of a rechargeable battery according to an embodiment.
Figure 7:
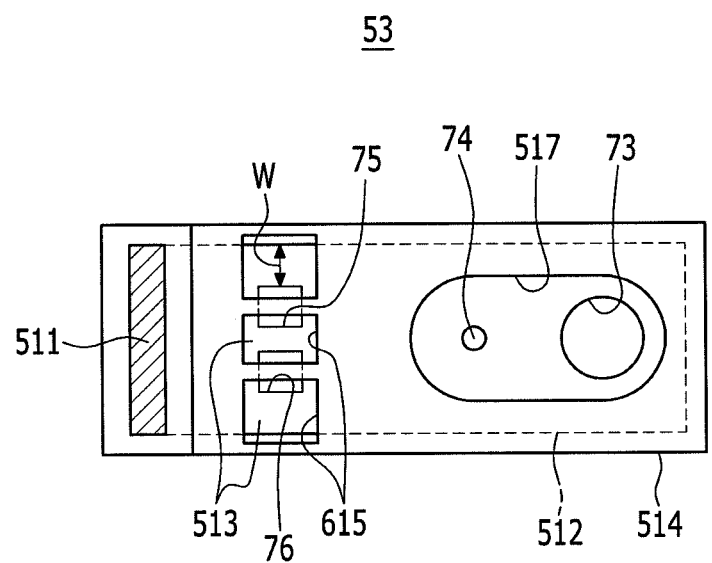
FIG. 7 illustrates a cross-sectional view of the lead tab taken along line VII-VII of FIG. 6.

FIG. 6 illustrates a cross-sectional view of a lead tab of a rechargeable battery according to an embodiment, and FIG. 7 illustrates a cross-sectional view of the lead tab taken along line VII-VII of FIG. 6. Referring to FIGS. 6 and 7, in a lead tab 53, an exposing hole 615 may be formed toward or may be open toward the electrode assembly 10. For example, an injection material 614 may expose the electrode assembly 10 side of the fuse 513 by or through the exposing hole 615. Therefore, when the fuse 513 is melted, and while the injection material 614 is being melted by a generated heat (e.g., from the melted fuse 513), the injection material 614 may smoothly discharge generated gas toward the electrode assembly 10 through the exposing hole 615.

Further, portions of the injection material 614 at sides of the exposing hole 615 may hold the melted fuse 513. Thus, the injection material 614 may help prevent the melted fuse 513 from being further deformed toward the electrode assembly 10 and/or may help prevent the melt fuse 513 from being re-connected. When the injection material 614 has high electrical resistance, disconnected portions of the melted fuse 513 may be electrically isolated by the injection material 614. Thus, when the fuse 513 operates, occurrence of an arc may be reduced and/or prevented.

Figure 8:
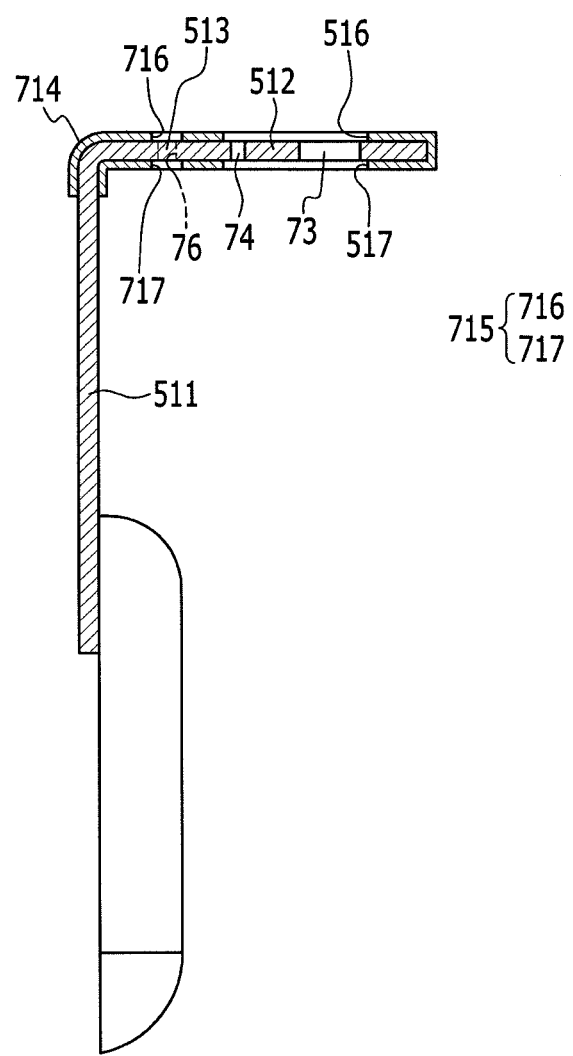
FIG. 8 illustrates a cross-sectional view of a lead tab of a rechargeable battery according to an embodiment.

FIG. 8 illustrates a cross-sectional view of a lead tab of a rechargeable battery according to an embodiment. Referring to FIG. 8, in the lead tab 54, an exposing hole 715 may include an upper hole 716 (that is formed toward or open toward the cap plate 20) and a lower hole 717 (that is formed toward or open toward the electrode assembly 10).

For example, an injection material 714 may expose the cap plate 20 side of the fuse 513 by or through the upper hole 716 and may expose the electrode assembly 10 side of the fuse 513 by or through the lower hole 717. Therefore, the injection material 714 may simultaneously discharge gas (generated while being melting by heat from the melting fuse 513) to the cap plate 20 side and the electrode assembly 10 side through the upper hole 716 and the lower hole 717.

By way of summation and review, a lead tab may include a terminal connection portion (that is connected to the electrode terminal) and a current collecting connection portion (that is connected to the electrode assembly). The terminal connection portion may include a fuse that is melted in response to an excessively high voltage to interrupt a current.

When the fuse operates (e.g., is melted), in order to reduce and/or prevent occurrence of an arc, insert injection molding of the terminal connection portion (including the fuse) may be performed. Therefore, an injection material (e.g., polypropylene) may embed the fuse and the terminal connection portion.

However, an injection material in which insert injection is performed may have lower or inferior thermal characteristics. Therefore, when the fuse is melted, the injection material may be melted by heat and thus may generate a gas. The melted fuse may be deformed by a melting gas of the injection material and may be undesirably re-connected.

The embodiments provide a rechargeable battery having a lead tab that connects an electrode assembly to an electrode terminal.

The embodiments provide a rechargeable battery in which a fuse is prevented from being deformed by a gas generated by an injection material when the fuse operates.

The embodiments provide a rechargeable battery in which an arc is prevented from occurring or in which an arc is reduced when a fuse operates.

According to an embodiment, by embedding a fuse that is formed in a terminal connection portion of a lead tab with an injection material and by forming an exposing hole in the injection material, the fuse may be exposed. Thus, when the fuse is melted, a gas that may be generated in the injection material may be discharged through the exposing hole.

The injection material may hold the melted fuse. Thus, the fuse may be prevented from being deformed again. Further, by connecting the melted fuse to an injection material having high electrical resistance, when the fuse operates, occurrence of an arc may be reduced and/or prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
    an electrode assembly that performs a charge and discharge operation;
    a case that houses the electrode assembly;
    a cap plate coupled to an opening of the case;
    an electrode terminal installed in the cap plate; and
    a lead tab that connects the electrode assembly to the electrode terminal,
    wherein the lead tab includes:
        a current collecting connection portion that is connected to the electrode assembly;
        a terminal connection portion that is bent from the current collecting connection portion to be connected to the electrode terminal; and
        an injection material that embeds the terminal connection portion in which a fuse is formed, the fuse between a first hole and a second hole in the terminal connection portion, and wherein the injection material includes an exposing hole therein, the exposing hole overlapping and exposing at least a portion of the fuse.

2. The rechargeable battery as claimed in claim 1, wherein the exposing hole is open toward the cap plate.

3. The rechargeable battery as claimed in claim 1, wherein the exposing hole is open toward the electrode assembly.

4. The rechargeable battery as claimed in claim 1, wherein the exposing hole includes:
    an upper hole that is open toward the cap plate; and
    a lower hole that is open toward the electrode assembly.

5. The rechargeable battery as claimed in claim 1, wherein the injection material includes poly ethyl ether ketone.

6. The rechargeable battery as claimed in claim 5, wherein the injection material further includes carbon.

7. The rechargeable battery as claimed in claim 5, wherein the poly ethyl ether ketone includes one of polyphenylene sulfide or polycarbonate.

8. The rechargeable battery as claimed in claim 1, wherein the injection material has a mounting hole at a cap plate side thereof and at an electrode assembly side thereof in order to couple to the electrode terminal.

9. The rechargeable battery as claimed in claim 1, wherein the injection material is formed of an insulating and heat-stable material.

10. The rechargeable battery as claimed in claim 1, wherein the fuse includes a material that melts in response to a predetermined voltage, and the injection material is attached to the lead tab on respective sides of the exposing hole to maintain a disconnected state of the fuse upon melting of the fuse.

11. The rechargeable battery as claimed in claim 1, wherein the fuse includes a material that melts in response to a predetermined voltage, and the injection material electrically isolates ends of the fuse upon melting of the fuse.

12. The rechargeable battery as claimed in claim 1, wherein:
    the fuse has a first width; and
    the exposing hole has a second width greater than the first width.

13. The rechargeable battery as claimed in claim 1, wherein the fuse, the injection material, and the exposing hole are disposed inside the cap plate.

14. A lead tab, comprising:
    a fuse;
    a conductive surface including the fuse;
    an insulation material on the conductive surface,
    wherein the fuse is between a first hole and a second hole in the conductive surface, and wherein the insulation material includes a third hole overlapping and exposing at least a portion of the fuse.

15. The lead tab as claimed in claim 14, wherein the third hole overlaps and exposes a portion of at least one of the first hole or the second hole.

16. The lead tab as claimed in claim 14, wherein the third hole overlaps and exposes at least a portion of each of the first and second holes and opposing edges of the fuse.

17. The lead tab as claimed in claim 16, wherein:
the insulation material includes a fourth hole and a fifth hole,
the fourth hole overlaps and exposes at least a portion of the first hole, and
the fifth hole overlaps and exposes at least a portion of the second hole.

18. The lead tab as claimed in claim 14, wherein:
the conductive surface includes a bent area between first and second sections; and
the insulation material overlaps the bent area, at least a portion the first section, and at least a portion of the second section.

* * * * *